US011823363B2

United States Patent
Liu et al.

(10) Patent No.: US 11,823,363 B2
(45) Date of Patent: Nov. 21, 2023

(54) INFRARED AND VISIBLE LIGHT FUSION METHOD

(71) Applicant: DALIAN UNIVERSITY OF TECHNOLOGY, Liaoning (CN)

(72) Inventors: Risheng Liu, Liaoning (CN); Xin Fan, Liaoning (CN); Jinyuan Liu, Liaoning (CN); Wei Zhong, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 343 days.

(21) Appl. No.: 17/282,597

(22) PCT Filed: Mar. 5, 2020

(86) PCT No.: PCT/CN2020/077953
§ 371 (c)(1),
(2) Date: Apr. 2, 2021

(87) PCT Pub. No.: WO2021/120404
PCT Pub. Date: Jun. 24, 2021

(65) Prior Publication Data
US 2022/0044374 A1    Feb. 10, 2022

(30) Foreign Application Priority Data
Dec. 17, 2019   (CN) .......................... 201911302901.5

(51) Int. Cl.
*G06T 5/50*       (2006.01)
*G06T 7/80*       (2017.01)
(Continued)

(52) U.S. Cl.
CPC .............. *G06T 5/50* (2013.01); *G06T 3/4053* (2013.01); *G06T 5/10* (2013.01); *G06T 7/30* (2017.01);
(Continued)

(58) Field of Classification Search
CPC    G06T 5/50; G06T 3/4053; G06T 5/10; G06T 7/30; G06T 7/80; G06T 7/90;
(Continued)

(56) References Cited

U.S. PATENT DOCUMENTS

2012/0081553 A1*  4/2012  Cote ........................ G06T 5/20
                                                    348/E9.037
2013/0308197 A1*  11/2013  Duparre ................. H04N 25/41
                                                    359/621
(Continued)

FOREIGN PATENT DOCUMENTS

CN        104700381 A  *  6/2015
CN        106960428 A  *  7/2017
(Continued)

*Primary Examiner* — Tom Y Lu
*Assistant Examiner* — Pardis Sohraby
(74) *Attorney, Agent, or Firm* — MUNCY, GEISSLER, OLDS & LOWE, P.C.

(57) ABSTRACT

The present invention provides an infrared and visible light fusion method, and belongs to the field of image processing and computer vision. The present invention adopts a pair of infrared binocular camera and visible light binocular camera to acquire images, relates to the construction of a fusion image pyramid and a significant vision enhancement algorithm, and is an infrared and visible light fusion algorithm using multi-scale transform. The present invention uses the binocular cameras and NVIDIATX2 to construct a high-performance computing platform and to construct a high-performance solving algorithm to obtain a high-quality infrared and visible light fusion image. The present invention constructs an image pyramid by designing a filtering template according to different imaging principles of infrared and visible light cameras, obtains image information at different scales, performs image super-resolution and sig- (Continued)

Visible light image    Constructing a multi-scale pyramid

Infrared image    Constructing a multi-scale pyramid nificant enhancement, and finally achieves real-time performance through GPU acceleration.

7 Claims, 4 Drawing Sheets

(51) Int. Cl.
    *G06T 7/30*     (2017.01)
    *G06T 7/90*     (2017.01)
    *G06T 3/40*     (2006.01)
    *G06T 5/10*     (2006.01)

(52) U.S. Cl.
    CPC ............ *G06T 7/80* (2017.01); *G06T 7/90* (2017.01); *G06T 2207/10024* (2013.01); *G06T 2207/10048* (2013.01); *G06T 2207/20221* (2013.01)

(58) Field of Classification Search
CPC . G06T 2207/10024; G06T 2207/10048; G06T 2207/20221
USPC .......................................................... 382/167
See application file for complete search history.

(56) References Cited

U.S. PATENT DOCUMENTS

2020/0104584 A1\*   4/2020   Zheng .................... H04N 23/11
2021/0215475 A1\*   7/2021   Rydström ................ G06T 7/80

FOREIGN PATENT DOCUMENTS

| CN | 109146854 A | \* | 1/2019 | ............ G06T 5/002 |
| CN | 109670522 A | | 4/2019 | |
| WO | WO-2019196539 A1 | \* | 10/2019 | |

\* cited by examiner

INFRARED AND VISIBLE LIGHT FUSION METHOD

TECHNICAL FIELD

The present invention belongs to the field of image processing and computer vision, adopts a pair of infrared camera and visible light camera to acquire images, relates to the construction of a fusion image pyramid and a significant vision enhancement algorithm, and is an infrared and visible light fusion algorithm using multi-scale transform.

BACKGROUND

The binocular stereo vision technology based on visible light band is developed to be relatively mature. Visible light imaging has rich contrast, color and shape information, so the matching information between binocular images can be obtained accurately and quickly so as to obtain scenario depth information. However, visible light band imaging has defects, and the imaging quality thereof is greatly reduced, for example, in strong light, fog rain, snow or night, which affects the matching precision. Therefore, the establishment of a color fusion system by using the complementarity of different band information sources is an effective way to produce more credible images in special environments. For example, a visible light band binocular camera and an infrared band binocular camera are used to form a multi-band stereo vision system, and the advantage of not being affected by fog, rain, snow and light of infrared imaging is used to can make up for the deficiency of visible light band imaging so as to obtain more complete and precise fusion information.

Image fusion is a promising research in the field of image processing. Images formed by two different types of imaging sensors or similar sensors with different focal lengths and exposures can be synthesized into a more informative image through the image fusion technology, which is more suitable for later processing and research. The advantages make image fusion widely developed in the fields such as remote sensing, camera or mobile phone imaging, monitoring and reconnaissance, and especially, the fusion of infrared and visible light images plays a very important role in the military field. In recent years, most of fusion methods are researched and designed based on the transform domain without considering the multi-scale detail information of images, resulting in the loss of details in the fused image, for example, the public patent CN208240087U [Chinese], an infrared and visible light fusion system and image fusion device. The traditional multi-scale transform is mainly composed of linear filters, and easily produces halo artifacts during the decomposition process. Edge keeping filters can avoid the phenomenon of halo artifacts at the edge while better retaining the edge characteristics of images, and obtain better results in image fusion, thus attracting more and more attention. Therefore, the present invention realizes the enhancement of details and the removal of artifacts on the basis of retaining the effective information of infrared and visible light images.

SUMMARY

To overcome the defects in the prior art, the present invention provides an infrared and visible light real-time fusion algorithm based on multi-scale pyramid transform, which constructs an image pyramid by designing a filtering template, obtains image information at different scales, performs image super-resolution and significant enhancement, and finally achieves real-time performance through GPU acceleration.

The present invention has the following specific technical solution:

An infrared and visible light fusion method, comprises the following steps:

1) Converting the color space of a visible light image from an RGB image to an HSV image, extracting the value information of the color image as the input of image fusion, and retaining the original hue and saturation;

2) Creating a filtering kernel template: constructing the corresponding filtering kernel template according to the sizes of infrared and visible light images; for example, when infrared and visible light images of 640*480 are input, the kernel template is as follows:

$$\begin{bmatrix} 0.015 & 0.031 & 0.062 & 0.031 & 0.015 \\ 0.031 & 0.062 & 0.125 & 0.062 & 0.031 \\ 0.062 & 0.125 & 0.25 & 0.125 & 0.062 \\ 0.031 & 0.062 & 0.125 & 0.062 & 0.031 \\ 0.015 & 0.031 & 0.062 & 0.031 & 0.015 \end{bmatrix}$$

3) Constructing an image pyramid by using the filtering kernel template convolution;

4) Extracting the details of the pyramid at different scales by the linear interpolation method;

5) Distinguishing the details of infrared and visible light of each layer of the pyramid by using the saliency of the details, convolving the images by using the designed sliding window to generate a weight matrix, and comparing the neighborhood information of each pixel according to the weight matrix to distinguish and extract more credible detail images.

6) Linearly adding the infrared and visible light images of the smallest scale to obtain a smooth background image, fusing the extracted detail images into the background image, performing super-resolution upscaling on the image, then adding the detail information of the upper-layer scale, and iterating successively up to the top of the pyramid.

6-1) The super-resolution technology uses the cubic convolution interpolation to obtain richer details of a magnified image than the bilinear interpolation, the weight of each pixel value is determined by the distance from the pixel to the pixel to be determined, and the distance includes distances in horizontal and vertical directions.

7) Converting the color space: converting the fusion image back to the RGB image, and adding the hue and saturation previously retained.

8) Enhancing the color: Enhancing the color of the fusion image to generate a fusion image with higher resolution and contrast. Performing pixel-level image enhancement for the contrast of each pixel.

The present invention has the following beneficial effect: the present invention designs a real-time fusion method using infrared and visible light binocular stereo cameras. The present invention solves the details of infrared and visible light by using the multi-scale pyramid transform, carries out inverse pyramid transform with the super-resolution technology, constructs a highly credible fusion image, and has the following characteristics: (1) the system is easy to construct, and the input data can be acquired by using stereo binocular cameras; (2) the program is simple and easy to implement; (3) better details of the image are obtained by pyramid multi-scale transform; (4) the problem of loss of inverse pyramid transform details is effectively made up with the super-resolution technology; (5) the structure is complete, multi-thread operation can be performed, and the program is robust; and (6) the detail images are used to perform significant enhancement and differentiation to improve the generalization ability of the algorithm.

DETAILED DESCRIPTION

The present invention proposes a method for real-time image fusion by an infrared camera and a visible light camera, and will be described in detail below in combination with drawings and embodiments.

Figure 1:
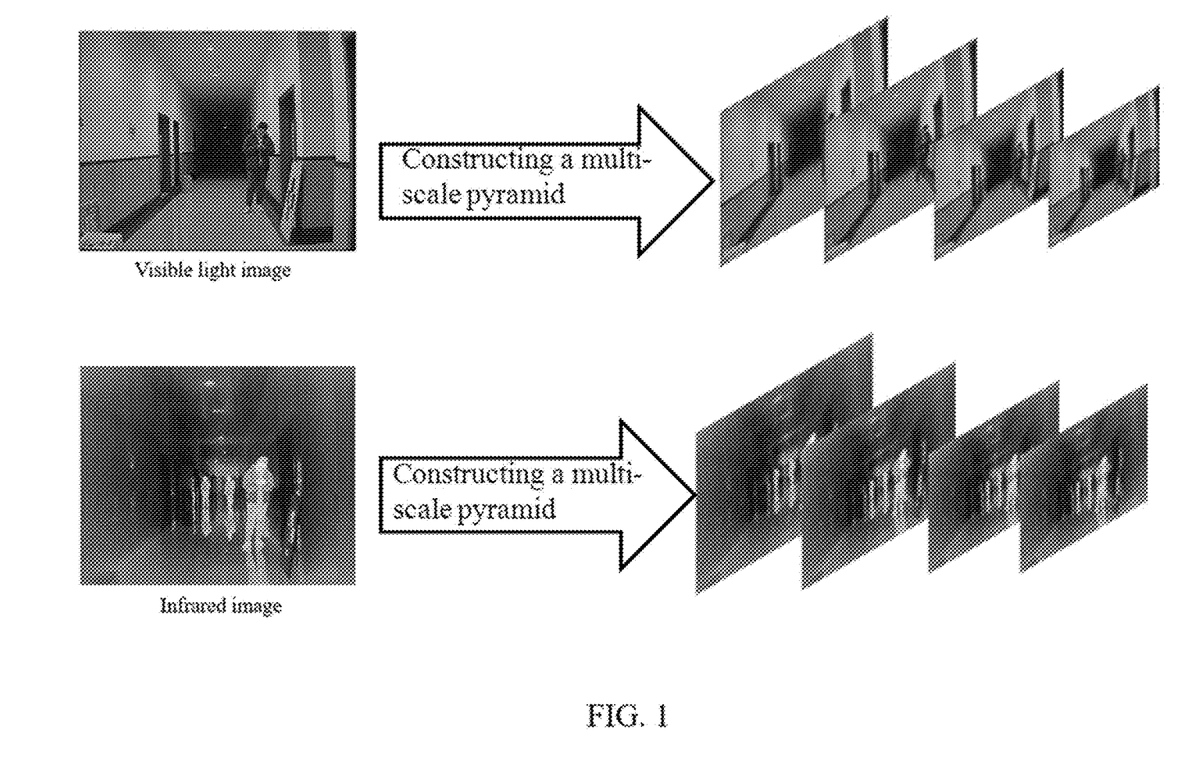
FIG. 1 shows infrared and visible light images acquired by an acquisition platform and a schematic diagram of pyramid multi-scale decomposition.

A binocular stereo camera is placed on a fixed platform. In the embodiment, the image resolution of the camera is 1280×720, and the field angle is 45.4°; and the experimental platform is shown in FIG. 1, and NVIDIATX2 is used for calculation to ensure timeliness. On this basis, an infrared and visible light fusion method is provided, and the method comprises the following steps:

1) Obtaining registered infrared and visible light images 1-1) Respectively calibrating each lens of the visible light binocular camera and the infrared binocular camera and jointly calibrating the respective systems;

1-2) Respectively calibrating the infrared binocular camera and the visible light binocular camera by the Zhangzhengyou calibration method to obtain internal parameters such as focal length and principal point position and external parameters such as rotation and translation of each camera;

1-3) Calculating the positional relationship of the same plane in the visible light image and the infrared image by using the external parameter RT obtained by the joint calibration method and the detected checker corners, and registering the visible light image to the infrared image by using a homography matrix.

2) Performing multi-scale pyramid transform on the images, and using the designed filtering template to respectively perform down-convolution and down-sampling on the infrared image and the visible light image, as shown in FIG. 1, wherein the filtering template acquisition mode is shown in the formula below:

$$h(x, y) = e^{-\frac{x^2+y^2}{2\sigma^2}} \quad (1)$$

wherein x is the distance between other pixels and the center pixel in the neighborhood; y is the distance between other pixels and the center pixel in the neighborhood; and a is a standard deviation parameter.

3) Extracting the details of the infrared and visible light images based on multi-scale pyramid transform, and using the high frequency of the images obtained by the linear interpolation method as the detail layer of fusion.

Figure 2:
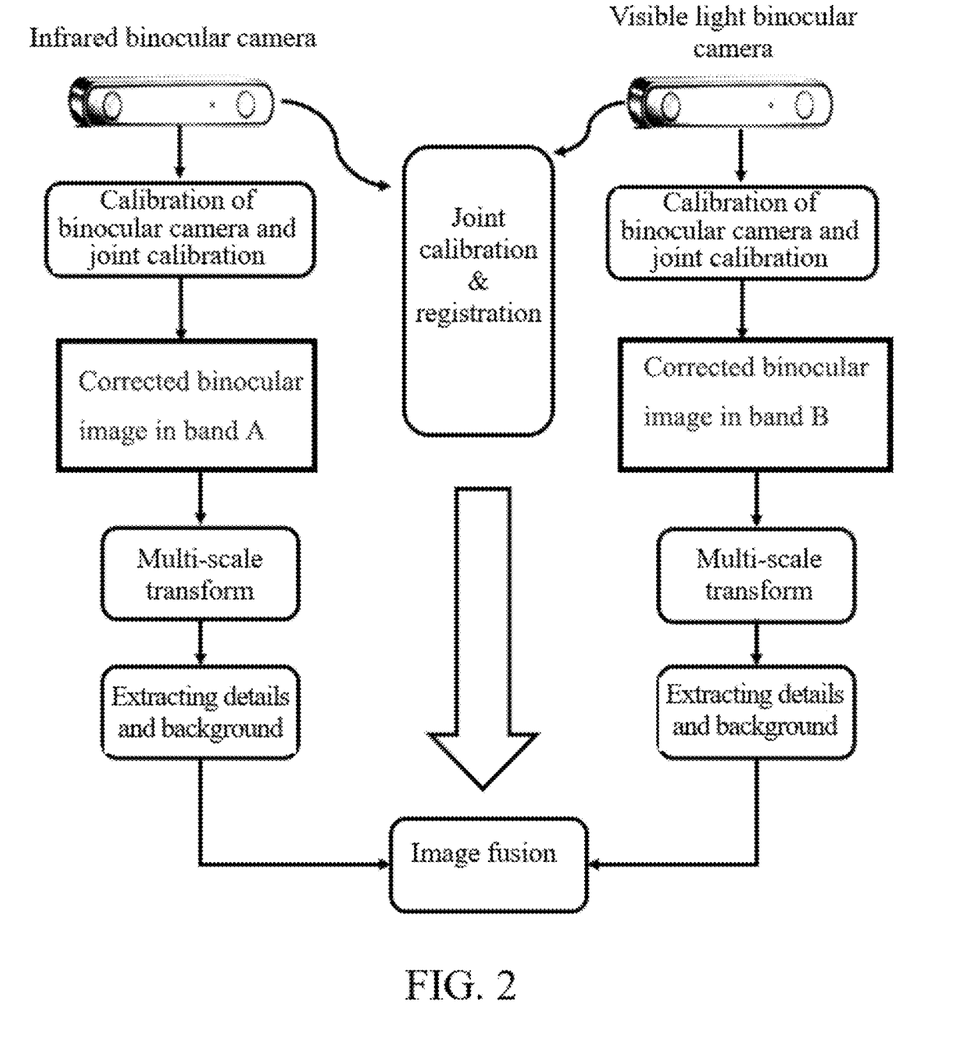
FIG. 2 is a step chart of overall image acquisition and fusion.
Figure 3:
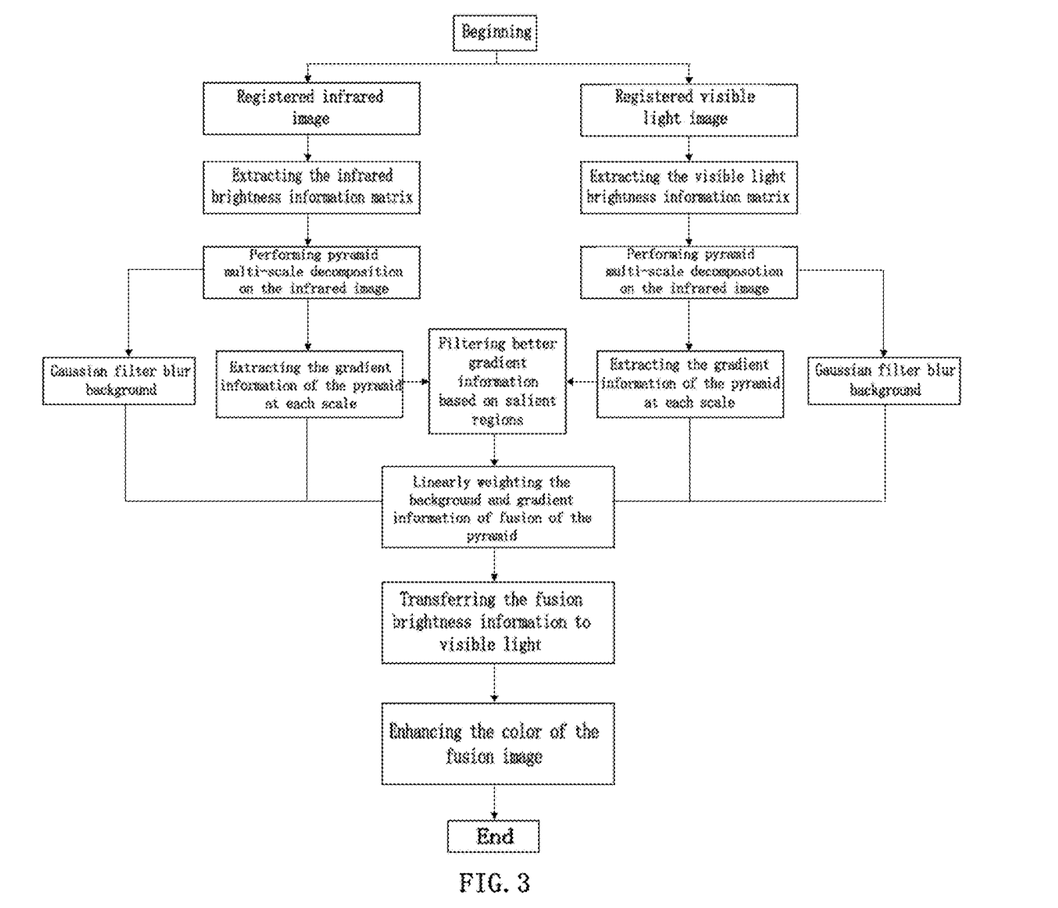
FIG. 3 is a flow chart of the present invention.

The following is the main flow of the algorithm as shown in FIG. 2, and the specific description is as follows:

4) Converting the color space of the image 4-1) In view of the problem that the visible light image has RGB three channels, converting the RGB color space to the HSV color space, extracting the V (value) information of the visible light image to be fused with the infrared image, and retaining H (hue) and S (saturation), wherein the specific conversion is shown as follows:

$$R' = \frac{R}{255} \quad (2)$$

$$G' = \frac{G}{255} \quad (3)$$

$$B' = \frac{B}{255} \quad (4)$$

$$C\max = \max(R', G', B') \quad (5)$$

$$C\min = \min(R', G', B') \quad (6)$$

$$\Delta = C\max - C\min \quad (7)$$

$$V = C\max \quad (8)$$

wherein R is a red channel, G is a green channel, and B is a blue channel; R' is the red channel after color space conversion, G' is the green channel after color space conversion, and B' is the blue channel after color space conversion; Cmax represents the maximum value among R', G', B'; Cmin represents the minimum value among R', G', B'; and Δ represents the difference between the maximum value and the minimum value among R', G', B';

4-2) Extracting the V (value) channel as the input of visible light, retaining the hue H and saturation S to the corresponding matrix, and retaining the color information for the subsequent color restoration after fusion.

5) Convolving details by filtering, and filtering infrared and visible light detail images 5-1) Designing two 3×3 empty matrixes, starting convolution sequentially from the starting pixels of the two images, distinguishing eight neighborhood pixels of the corresponding points in the visible light and infrared detail images, distinguishing the saliency stationary points of the corresponding neighborhood pixels, taking 1 for large ones and 0 for small ones, and respectively saving in the corresponding matrixes; and updating sequentially till the last pixel of the image;

5-2) According to the weight of the generated matrix, fusing the detail images of the infrared and visible light images to generate a detail image with richer texture.

6) Performing inverse multi-scale pyramid transform by using image super-resolution 6-1) Selecting the cubic convolution interpolation super-resolution algorithm for inverse multi-scale pyramid transform; from the deepest down-sampled sub-image, after fusing the detail images, expanding the image to the second deepest sub-image by super-resolution, and iterating successively until restoring to the original image size; with a pixel as an example, the distances between the pixel and the pixel to be determined in the vertical and horizontal directions are respectively 1+u and v, the weight of the pixel is w=w(1+u)×w(v), and then the pixel value f(i+u,j+v) of the pixel to be determined is calculated as follows:

$$f(i+u, j+v) = A \times Q \times P \quad (9)$$

wherein A, Q and P are matrixes generated by the distances;
and A=[w(1+u) w(u) w(1−u) w(2−u)];

$$P = [\, w(1+v) \quad w(v) \quad w(1-v) \quad w(2-v)\,]^T;$$

$$Q = \begin{bmatrix} f(i-1, j-1) & f(i-1, j+0) & f(i-1, j+1) & f(i+2, j+2) \\ f(i+0, j-1) & f(i+0, j+0) & f(i+0, j+1) & f(i+2, j+2) \\ f(i+1, j-1) & f(i+1, j+0) & f(i+1, j+1) & f(i+2, j+2) \\ f(i+2, j-1) & f(i+2, j+0) & f(i+2, j+1) & f(i+2, j+2) \end{bmatrix}.$$

The interpolation kernel w(x) is:

$$w = \begin{cases} 1 - 2|x|^2 + |x|^3 & |x| < 1 \\ 4 - 8|x| + 5|x|^2 - |x|^3 & 1 \le |x| < 2 \\ 0 & |x| \ge 2 \end{cases} \quad (10)$$

Finally, according to the weight and value of the pixel, calculating the pixel value of the corresponding position of the pixel after super-resolution;

6-2) Saving the super-resolved fusion image in a newly established zero matrix to prepare for the next step.

7) Performing restoration and color enhancement on the color space 7-1) Restoring to the RGB color space from the HSV color space by saving the super-resolved fusion image into the V (value) channel for updating in combination with the previously retained H (hue) and S (saturation), wherein the specific update formulas are shown as follows:

$$C = V \times S \quad (11)$$

$$X = C \times (1 - |(H/60°) \bmod 2 - 1|) \quad (12)$$

$$m = V - C \quad (13)$$

$$(R', G', B') = \begin{cases} (C, X, 0), & 0° \le H < 60° \\ (X, C, 0), & 60° \le H < 120° \\ (0, C, X), & 120° \le H < 180° \\ (0, X, C), & 180° \le H < 240° \\ (X, 0, C), & 240° \le H < 300° \\ (C, 0, X), & 300° \le H < 360° \end{cases} \quad (14)$$

$$R', G', B' = ((R' + m) \times 255, (G' + m) \times 255, (B' + m) \times 255) \quad (15)$$

wherein C is the product of the value and the saturation; and m is the difference between the value and C.

Figure 4:
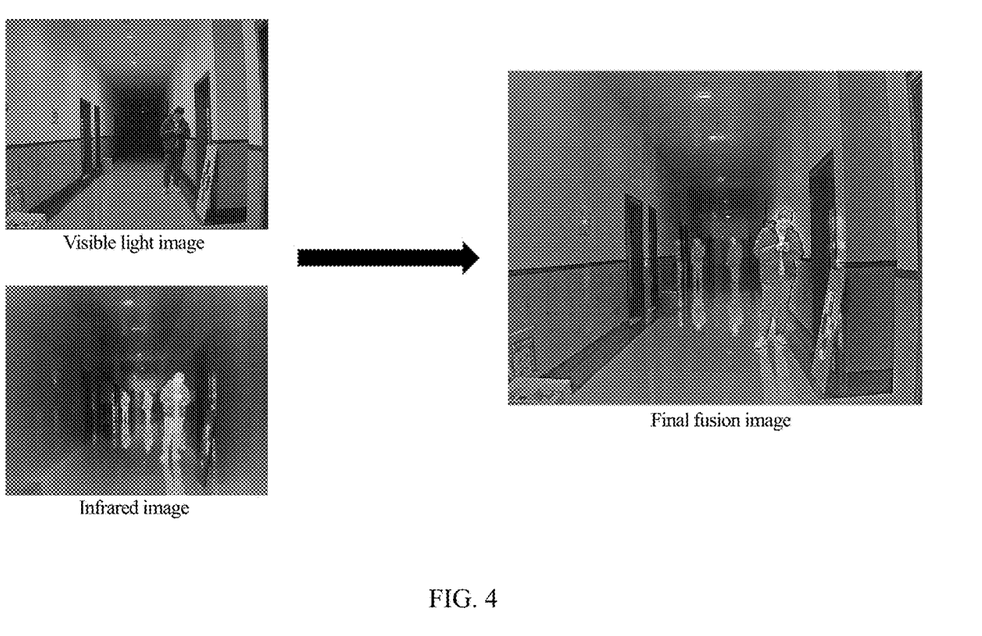
FIG. 4 is a final fusion image of the present invention.

7-2) Performing color correction and enhancement on the image restored in step 7-1) to generate a three-channel image that is more consistent with observation and detection; and performing color enhancement on the R channel, G channel and B channel respectively, as shown in the formulas below:

$$R_{out} = (R_{in})^{1/gamma} \quad (16)$$

$$R_{display} = \left(R_{in}^{(1/gamma)}\right)^{gamma} \quad (17)$$

$$G_{out} = (G_{in})^{1/gamma} \quad (18)$$

$$G_{display} = (G_{in})^{(1/gamma)^{gamma}} \quad (19)$$

$$B_{out} = (B_{in})^{1/gamma} \quad (20)$$

$$B_{display} = \left(B_{in}^{(1/gamma)}\right)^{gamma} \quad (21)$$

wherein gamma is a brightness enhancement parameter; $R_{out}$ is inverse transform of the red channel after gamma correction; $R_{in}$ is the value of the initial red channel; $R_{display}$ is the value of the R channel after gamma correction; $G_{display}$ is the value of the G channel after gamma correction; and $B_{display}$ is the numerical compensation value of the B channel after gamma correction. The generated image is shown in FIG. 4.

The invention claimed is:

1. An infrared and visible light fusion method, wherein the fusion method comprises the following steps:
   1) obtaining registered infrared images and visible light images;
   2) performing multi-scale pyramid transform on the infrared images and visible light images, and using the designed filtering template to respectively perform down-convolution and down-sampling on the infrared images and the visible light images, wherein the filtering template acquisition mode is:

$$h(x, y) = e^{-\frac{x^2 + y^2}{2\sigma^2}} \quad (1)$$

wherein x is a horizontal distance between other pixels and the center pixel in neighborhood; y is a vertical distance between other pixels and the center pixel in the neighborhood; and a is a standard deviation parameter;
   3) extracting the details of the infrared images and visible light images based on multi-scale pyramid transform, and using the high frequency of the infrared images and visible light images obtained by the linear interpolation method as the detail layer of fusion;
   4) converting a color space of the image infrared images and visible light images;
   5) convolving details by filtering, and filtering infrared detail images and visible light detail images;
   6) performing inverse multi-scale pyramid transform by using image super-resolution;
   7) performing restoration and color enhancement on the color space;
   wherein step 1) comprises the following specific steps:
   1-1) respectively calibrating each lens of the visible light binocular camera and the infrared binocular camera and jointly calibrating the respective systems;
   1-2) respectively calibrating the infrared binocular camera and the visible light binocular camera by the Zhangzhengyou calibration method to obtain internal parameters and external parameters of each camera, wherein the internal parameters include focal length and principal point position, and the external parameters include rotation and translation;
   1-3) calculating the positional relationship of the same plane in the visible light images and the infrared images by using the external parameter RT obtained by the joint calibration method and the detected checker corners, and registering the visible light images to the infrared images by using a homography matrix.

2. The infrared and visible light fusion method according to claim 1, wherein step 4) comprises the following specific steps:

4-1) when the visible light images have RGB three channels, converting an RGB color space to an HSV color space, wherein the specific conversion is shown as follows:

$$R' = \frac{R}{255} \quad (2)$$

$$G' = \frac{G}{255} \quad (3)$$

$$B' = \frac{B}{255} \quad (4)$$

$$C\max = \max(R', G', B') \quad (5)$$

$$C\min = \min(R', G', B') \quad (6)$$

$$\Delta = C\max - C\min \quad (7)$$

$$V = C\max \quad (8)$$

wherein R is a red channel, G is a green channel, and B is a blue channel; R' is the red channel after color space conversion, G' is the green channel after color space conversion, and B' is the blue channel after color space conversion; Cmax represents the maximum value among R', G', B'; Cmin represents the minimum value among R', G', B'; and Δ represents the difference between the maximum value and the minimum value among R', G', B';

4-2) extracting value information V as an input of visible light, retaining hue H and saturation S to the corresponding matrix, and retaining the color information for the subsequent color restoration after fusion.

3. The infrared and visible light fusion method according to claim 1, wherein step 5) comprises the following specific steps:
   5-1) designing two 3×3 empty matrixes, starting convolution sequentially from the starting pixels of the visible light detailed images and the infrared detail images, distinguishing eight neighborhood pixels of the corresponding points in the visible light detailed images and the infrared detail images, distinguishing the saliency stationary points of the corresponding neighborhood pixels, taking 1 for large ones and 0 for small ones, and respectively saving in the corresponding matrixes; and updating sequentially till the last pixel of the image;
   5-2) according to a weight of the generated matrix, fusing the visible light detailed images and the infrared detail images of the infrared images and visible light images to generate a detail image with rich texture.

4. The infrared and visible light fusion method according to claim 2, wherein step 5) comprises the following specific steps:
   5-1) designing two 3×3 empty matrixes, starting convolution sequentially from the starting pixels of the two images, distinguishing eight neighborhood pixels of the corresponding points in the visible light detail images and the infrared detail images, distinguishing the saliency stationary points of the corresponding neighborhood pixels, taking 1 for large ones and 0 for small ones, and respectively saving in the corresponding matrixes; and updating sequentially till the last pixel of the image;
   5-2) according to the weight of the generated matrix, fusing the detail images of the infrared images and visible light images to generate a detail image with rich texture.

5. The infrared and visible light fusion method according to claim 1, wherein step 6) comprises the following specific steps:
   6-1) selecting a cubic convolution interpolation super-resolution algorithm for inverse multi-scale pyramid transform; from a deepest down-sampled sub-image, after fusing the infrared detail images and the visible light detail images, expanding the deepest down-sampled sub-image to a second deepest sub-image by super-resolution, and iterating successively until restoring to the original image size; in the case of a pixel, the distances between the pixel and the pixel to be determined in the vertical and horizontal directions are respectively 1+u and v, the weight of the pixel is w=w(1+u)×w(v), and then the pixel value f(i+u,j+v) of the pixel to be determined is calculated as follows:

$$f(i+u,j+v) = A \times Q \times P \quad (9)$$

wherein A, Q and P are matrixes generated by the distances; and A=[w(1+u) w(u) w(1−u) w(2−u)];

$$P = [w(1+v) \quad w(v) \quad w(1-v) \quad w(2-v)]^T;$$

$$Q = \begin{bmatrix} f(i-1,j-1) & f(i-1,j+0) & f(i-1,j+1) & f(i+2,j+2) \\ f(i+0,j-1) & f(i+0,j+0) & f(i+0,j+1) & f(i+2,j+2) \\ f(i+1,j-1) & f(i+1,j+0) & f(i+1,j+1) & f(i+2,j+2) \\ f(i+2,j-1) & f(i+2,j+0) & f(i+2,j+1) & f(i+2,j+2) \end{bmatrix};$$

the interpolation kernel w(x) is:

$$w = \begin{cases} 1 - 2|x|^2 + |x|^3 & |x| < 1 \\ 4 - 8|x| + 5|x|^2 - |x|^3 & 1 \leq |x| < 2 \\ 0 & |x| \geq 2 \end{cases} \quad (10)$$

finally, according to the weight and value of the pixel, calculating the pixel value of the corresponding position of the pixel after super-resolution;
   6-2) saving the super-resolved fusion image in a newly established zero matrix.

6. The infrared and visible light fusion method according to claim 3, wherein step 6) comprises the following specific steps:
   6-1) selecting a cubic convolution interpolation super-resolution algorithm for inverse multi-scale pyramid transform; from a deepest down-sampled sub-image, after fusing the infrared detail images and the visible light detail images, expanding the deepest down-sampled sub-image to a second deepest sub-image by super-resolution, and iterating successively until restoring to the original image size; in the case of a pixel, the distances between the pixel and the pixel to be determined in the vertical and horizontal directions are respectively 1+u and v, the weight of the pixel is w=w(1+u)×w(v), and then the pixel value f(i+u,j+v) of the pixel to be determined is calculated as follows:

$$f(i+u,j+v) = A \times Q \times P \quad (9)$$

wherein A, Q and P are matrixes generated by the distances; and A=[w(1+u) w(u) w(1−u) w(2−u)];

$$P = [w(1+v) \quad w(v) \quad w(1-v) \quad w(2-v)]^T;$$

$$Q = \begin{bmatrix} f(i-1,j-1) & f(i-1,j+0) & f(i-1,j+1) & f(i+2,j+2) \\ f(i+0,j-1) & f(i+0,j+0) & f(i+0,j+1) & f(i+2,j+2) \\ f(i+1,j-1) & f(i+1,j+0) & f(i+1,j+1) & f(i+2,j+2) \\ f(i+2,j-1) & f(i+2,j+0) & f(i+2,j+1) & f(i+2,j+2) \end{bmatrix};$$

the interpolation kernel w(x) is:

$$w = \begin{cases} 1 - 2|x|^2 + |x|^3 & |x| < 1 \\ 4 - 8|x| + 5|x|^2 - |x|^3 & 1 \le |x| < 2 \\ 0 & |x| \ge 2 \end{cases} \quad (10)$$

finally, according to the weight and value of the pixel, calculating the pixel value of the corresponding position of the pixel after super-resolution;

6-2) saving the super-resolved fusion image in a newly established zero matrix.

7. The infrared and visible light fusion method according to claim 1, wherein step 7) comprises the following specific steps:

7-1) restoring to an RGB color space from an HSV color space by saving a super-resolved fusion image into the value information V for updating in combination with the previously retained H (hue) and S (saturation), wherein the specific formulas are shown as follows:

$$C = V \times S \quad (11)$$

$$X = C \times (1 - |(H/60°) \mod 2 - 1|) \quad (12)$$

$$m = V - C \quad (13)$$

$$(R', G', B') = \begin{cases} (C, X, 0), & 0° \le H < 60° \\ (X, C, 0), & 60° \le H < 120° \\ (0, C, X), & 120° \le H < 180° \\ (0, X, C), & 180° \le H < 240° \\ (X, 0, C), & 240° \le H < 300° \\ (C, 0, X), & 300° \le H < 360° \end{cases} \quad (14)$$

$$R', G', B' = ((R' + m) \times 255, (G' + m) \times 255, (B' + m) \times 255) \quad (15)$$

wherein C is a product of the value and the saturation; and m is a difference between the value and C;

7-2) performing color correction and enhancement on the super-resolved fusion image restored in step 7-1) to generate a three-channel image that is consistent with observation and detection; and performing color enhancement on an R channel, a G channel and a B channel respectively, wherein the specific formulas are shown as follows:

$$R_{out} = (R_{in})^{1/gamma} \quad (16)$$

$$R_{display} = \left(R_{in}^{(1/gamma)}\right)^{gamma} \quad (17)$$

$$G_{out} = (G_{in})^{1/gamma} \quad (18)$$

$$G_{display} = \left(G_{in}^{(1/gamma)}\right)^{gamma} \quad (19)$$

$$B_{out} = (B_{in})^{1/gamma} \quad (20)$$

$$B_{display} = \left(B_{in}^{(1/gamma)}\right)^{gamma} \quad (21)$$

wherein gamma is a brightness enhancement parameter; $R_{out}$ is inverse transform of the red channel after gamma correction; $R_{in}$ is the value of the initial red channel; $R_{display}$ is the value of the R channel after gamma correction; $G_{display}$ is the value of the G channel after gamma correction; and $B_{display}$ is the numerical compensation value of the B channel after gamma correction.

\* \* \* \* \*